United States Patent
Nair (10) Patent No.: US 9,524,331 B2
(45) Date of Patent: Dec. 20, 2016

(54) METHOD AND SYSTEM FOR REPRESENTING OLAP QUERIES USING DIRECTED ACYCLIC GRAPH STRUCTURES IN A DATAGRID TO SUPPORT REAL-TIME ANALYTICAL OPERATIONS

(71) Applicant: NUWAFIN HOLDINGS LTD, Al-Qusais (UA)

(72) Inventor: Nandakumar Krishnan Nair, Dubai (UA)

(73) Assignee: NUWAFIN HOLDINGS LTD, Al-Qusais, Dubai ( * ) Notice: Subject to any disclaimer, the term of this patent is extended or adjusted under 35 U.S.C. 154(b) by 320 days.

(21) Appl. No.: 14/082,219

(22) Filed: Nov. 18, 2013

(65) Prior Publication Data

US 2015/0142724 A1    May 21, 2015

(51) Int. Cl.
*G06F 17/30* (2006.01)

(52) U.S. Cl.
CPC .............................. *G06F 17/30592* (2013.01)

(58) Field of Classification Search
None
See application file for complete search history.

(56) References Cited

U.S. PATENT DOCUMENTS

| | | | | |
|---|---|---|---|---|
| 8,341,164 B1* | 12/2012 | Rosenberg | ........ | G06F 17/30958 707/716 |
| 2006/0215564 A1* | 9/2006 | Breitgand | ........... | H04L 41/0631 370/241 |
| 2010/0017380 A1* | 1/2010 | Naibo | ............... | G06F 17/30398 707/E17.136 |
| 2011/0153548 A1* | 6/2011 | Varghese | ............ | G06F 17/3048 707/601 |
| 2011/0208690 A1* | 8/2011 | Cushing | ............ | G06F 17/30592 707/602 |
| 2012/0173243 A1* | 7/2012 | Anand | ................ | H04M 3/4936 704/270.1 |
| 2013/0282650 A1* | 10/2013 | Zhang | ............... | G06F 17/30592 707/605 |
| 2014/0032617 A1* | 1/2014 | Stanfill | ............ | G06F 17/30557 707/809 |

\* cited by examiner

*Primary Examiner* — Richard Bowen
(74) *Attorney, Agent, or Firm* — Barry Choobin; Patent 360 LLC (57) ABSTRACT

The various embodiments herein provide a method for representing OLAP (Online Analytical Processing) queries in a data grid in real time. The method comprises of providing a new OLAP query, building a directed acyclic graph structure for the OLAP query, initializing the graph structure by generating signals for one or more business entities, processing the generated signals of one or more entities, linking entities based on matching of query filter parameters specified in the OLAP query and calculating aggregate values at one or more nodes. The nodes in the directed acyclic graph comprises: a plurality of blue nodes adapted to maintain links to one or more business entities stored in a datagrid and to hold the aggregate values and a plurality of grey nodes adapted to hold the calculated aggregate values. The aggregate values comprise at least one of SUM, ACCOUNT and AVG.

7 Claims, 6 Drawing Sheets

METHOD AND SYSTEM FOR REPRESENTING OLAP QUERIES USING DIRECTED ACYCLIC GRAPH STRUCTURES IN A DATAGRID TO SUPPORT REAL-TIME ANALYTICAL OPERATIONS

BACKGROUND

1. Technical Field

The embodiments herein generally relate to an Online Analytical Processing (OLAP) systems and methods and particularly to techniques for representing OLAP queries using directed acyclic graph structures in a datagrid to support real-time analytical operations.

2. Description of the Related Art

Online Transaction Processing, or OLTP, refers to transaction-oriented applications which are used for data-entry and data retrieval processing for commercial purposes. For example, in a banking system, cash withdrawal using an Automated Teller Machine (ATM) represents a business transaction.

Online Analytical Processing, or OLAP, is a system to answer multi-dimensional analytical queries. The parameters of the OLAP system are dynamically configurable (i.e.) the OLAP query is constructed dynamically and the results for that query is obtained fairly quickly. The OLAP query results are typically used for reporting and monitoring purposes.

In conventional transaction processing systems, the business data is captured using entities representing real-world concepts like Customer, Account, Pricelist, Branch etc by identifying one or more attributes associated the entity. For example, the customer has attributes like name, address etc. The business rule defines the operations and constraints that are applied to people, processes and computing systems in an organization. The business rules are put in place to help an organization achieve its goals. Entities also have business rules associated with them. For example, the business rules: "A customer can have a maximum of three accounts" is a rule on the Customer-Account entity relationship.

The business rules are typically used to control the behavior of OLTP systems. For example, in a banking management system, a business rule for a daily maximum debit limit governs the cash withdrawal transactions.

Consider a following query:

```
SELECT COUNT *
FROM Customer, Account
WHERE
Customer. cust_id = Account.cust_id
AND Account.type = "Savings"
AND Customer.region = "USA"\
```

Typically, data is stored in disk as tables in Relational Databases or Key-Value pairs for File-based databases like Cassandra, Bigtable etc. In a Relational Database Management System (RDBMS), data is typically stored in tables. Considering a query having instructions to fetch details from two tables Customer table and Account table with a plurality of clauses to necessitate a table join operation between the Customer table and the Account table. This table join operation is performed by first determining the Cartesian product of Account×Customer, which is then filtered by the conditions in the WHERE clause. However, such operations are very time-consuming and are not suited for real time OLAP queries.

In view of the foregoing, there is a need to provide an appropriate method and system to support and ease the online analytical processing in real time. There also exists a need for a method and system for providing links to business entities involved in the processes. Further there exists a need for a method and system which enables dynamic addition, maintenance and updating of business transactions and corresponding business data.

The abovementioned shortcomings, disadvantages and problems are addressed herein and which will be understood by reading and studying the following specification.

SUMMARY

The primary objective of the embodiments herein is to provide a method and system for supporting real time online analytical processing and online transaction processing.

Another object of the embodiments herein is to provide an In-Memory Graph DataGrid for integrated execution of rule based transactions and constructing dynamic analytical queries with high performance.

Another object of the embodiments herein is to provide a close integration between business rule execution for the business entities and the underlying graph structure representing those entities.

Another object of the embodiments herein is to provide a method and system for successfully resolving complex queries involving joint operations spanning multiple entity types.

Another object of the embodiment herein is to provide a method and system for adding new OLAP queries into the production system at runtime.

Another object of the embodiment herein is to provide a method and system for constructing a graph structure for the newly added real time OLAP query and maintaining the links to relevant business entities.

Yet another object of the embodiment herein is to provide a method and system to analyze and process business data which is partitioned across different cluster nodes.

These and other objects and advantages of the present embodiments will become readily apparent from the following detailed description taken in conjunction with the accompanying drawings.

The various embodiments herein provide a method for representing OLAP (Online Analytical Processing) queries in a data grid in real time. The method comprises of providing a new OLAP query, building a directed acyclic graph structure for the OLAP query, initializing the graph structure by generating signals for one or more business entities, processing the generated signals of one or more business entities, linking the business entities based on matching of query filter parameters specified in the OLAP query and calculating aggregate values at one or more nodes.

According to an embodiment herein, the nodes in the directed acyclic graph comprises of a plurality of blue nodes adapted to maintain links to one or more business entities stored in a DataGrid and to hold the aggregate values and a plurality of grey nodes adapted to hold the calculated aggregate values. The aggregate value comprises at least one of SUM, ACCOUNT and AVG.

According to an embodiment herein, processing the signals of one or more business entities comprises of building links in the blue nodes for one or more relevant business entities, calculating aggregate values in the blue nodes from the linked business entities and propagating the aggregated values to other aggregation values in the grey nodes.

According to an embodiment herein, the signals comprise of +<entity object> signal; and −<entity object> signal.

According to an embodiment herein, the method further comprises of modifying the entity links and the aggregated values in the directed acyclic graph structure in response to a modification in the business data.

According to an embodiment herein, the method further comprises of representing multiple OLAP queries on a single entity by merging directed acyclic graph structure for each OLAP query.

According to an embodiment herein, the method further comprises of querying with partitioned business data comprises of merging query results from individual data grid in a shared distributed cache and merging results from OLAP queries from a plurality of data grids.

According to an embodiment herein, a plurality of push/pull mechanisms is employed to merge OLAP query results into the distributed cache.

According to an embodiment herein, a plurality of push/pull mechanisms comprises at least one of polling based on specific time intervals, on query request and continuous synchronization.

Embodiments herein further provide a system for representing OLAP queries in a data grid is provided. The system comprising one or more processors, one or more computer readable storage mediums containing instructions configured to cause one or more processors to perform operations including: providing a new OLAP query, building a directed acyclic graph structure for the query, initializing the graph structure by generating signals for one or more business entities, processing the generated signals of one or more entities, linking entities based on matching of query filter parameters specified in the OLAP query and calculating aggregate values at one or more nodes.

According to an embodiment herein, the system is further adapted for representing new OLAP queries that are added into the system while in production. When a new real time OLAP query is added to the system, the graph structure corresponding to the new OLAP query is constructed and the links to relevant business entities are maintained. Once the data grid structure is up and running, a real time processing support is provided for the newly added OLAP query.

According to an embodiment herein, the real time OLAP queries are pre-processed and links to the business entities participating in the query is maintained. These links are then dynamically updated at runtime as business data gets updated after new business transactions are processed.

According to an embodiment herein, aggregated information such as operations including SUM, COUNT, and AVERAGE etc is also maintained and updated dynamically.

The embodiments herein further work successfully when the business data is partitioned across different cluster nodes. In a distributed cluster with multiple nodes (with each node having its own datagrid), the OLAP query results are calculated from different cluster nodes and merged easily to produce the desired final output in real-time.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Although the specific features of the present embodiments are shown in some drawings and not in others. This is done for convenience only as each feature may be combined with any or all of the other features in accordance with the present embodiments.

DETAILED DESCRIPTION OF THE DRAWINGS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method for representing OLAP (Online Analytical Processing) queries in a data grid in real time. The method comprises providing a new OLAP query, building a directed acyclic graph structure for the OLAP query, initializing the graph structure by generating signals for one or more business entities, processing the generated signals of one or more business entities, linking business entities based on matching of query filter parameters specified in the OLAP query and calculating aggregate values at one or more nodes.

The nodes in the directed acyclic graph comprises a plurality of blue nodes adapted to maintain links to one or more business entities stored in a datagGrid and to hold the aggregate values and a plurality of grey nodes adapted to hold the calculated aggregate values. The aggregate values comprise at least one of SUM, ACCOUNT and AVG.

The processing the signals of the business entities comprises building links in the blue nodes for one or more relevant business entities, calculating aggregate values in the blue nodes from the linked business entities and propagating aggregated values to other aggregation values in the grey nodes. The signals herein comprises: +<entity object> signal and −<entity object> signal.

The entity links and the aggregated values in the directed acyclic graph structure are modified in response to a modification in the business data.

Here multiple OLAP queries are represented on a single entity by merging directed acyclic graph structure for each OLAP query. The method of querying with partitioned business data comprises of merging query results from individual data grid in a shared distributed cache and merging results from OLAP queries from a plurality of data grids. Here a plurality of push/pull mechanisms such as polling based on specific time intervals, on query request, continuous synchronization, and the like is employed to merge OLAP query results into the distributed cache.

Embodiments herein further comprise a system for representing OLAP queries in a data grid. The system comprising one or more processors, one or more computer readable storage mediums containing instructions configured to cause one or more processors to perform operations including providing a new OLAP query, building a directed acyclic graph structure for the query, initializing the graph structure by generating signals for one or more business entities, processing the generated signals of one or more entities, linking entities based on matching of query filter parameters specified in the OLAP query and calculating aggregate values at one or more nodes. The system is further adapted for representing new OLAP queries that are added into the system while in production.

Figure 1:
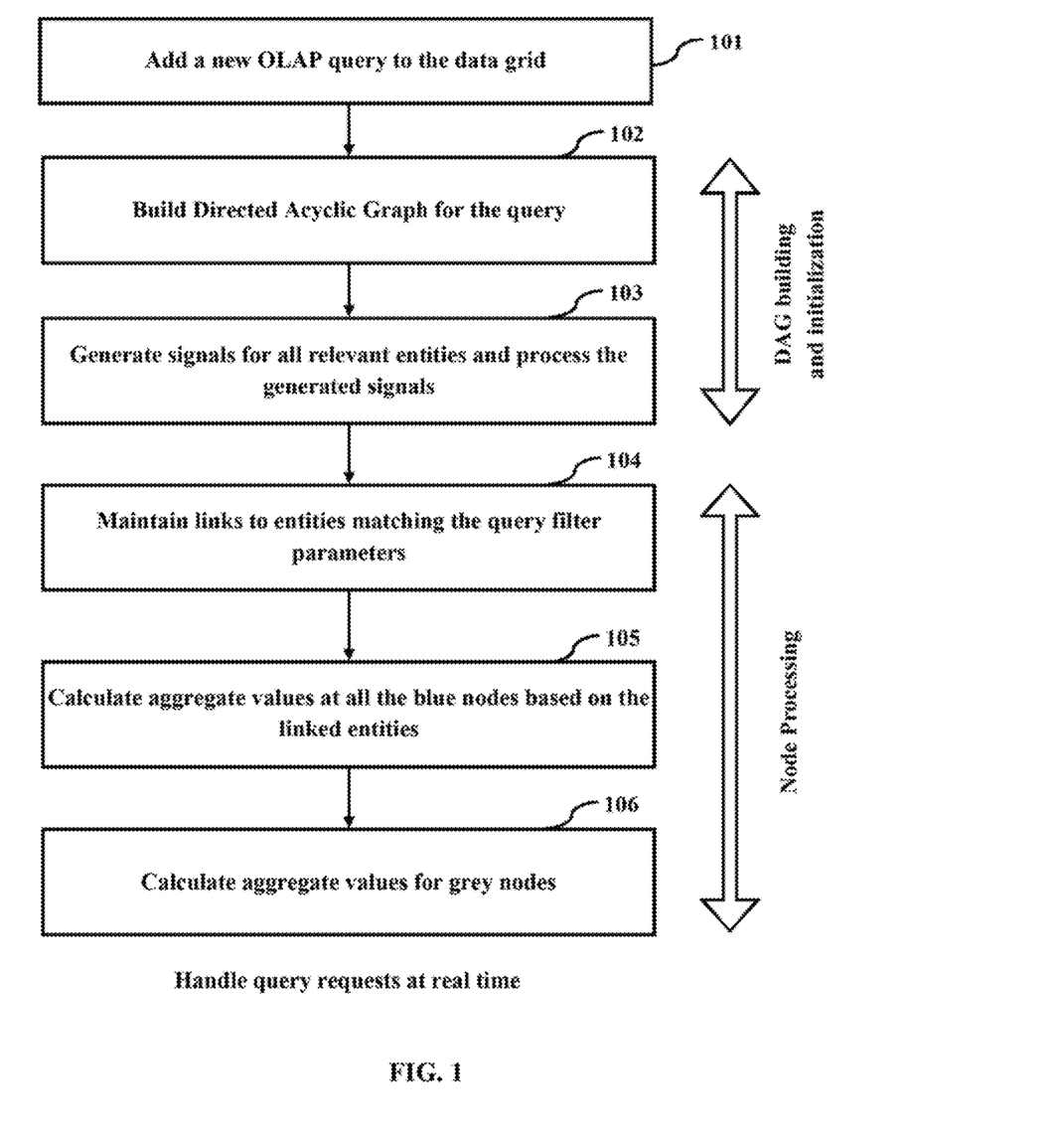
FIG. 1 is a flow diagram illustrating a process for building directed acyclic graph for a new OLAP query, according to an embodiment of the present disclosure.

FIG. 1 is a flow diagram illustrating a process for building directed acyclic graph for a new OLAP query, according to an embodiment of the present disclosure. The process comprises of adding a new OLAP query to the datagrid (101). After adding the new OLAP query to the datagrid, a Directed Acyclic Graph (DAG) structure is created (102). The DAG structure is then initialized by generating signals of the type "+<entity object>" for all relevant entities and the generated signals associated with the entities are then processed (103). Here processing of the signals comprises building links in blue nodes to all relevant business entities, calculating aggregate values in blue nodes from linked business entities and propagating aggregated values upwards to other aggregation values in grey nodes. The grey nodes are the primary nodes and the blue nodes are defined within the grey nodes. One or more links to entities such account entities which matches the query filter parameters are maintained at blue nodes (104). The query is raised automatically as per the transactions or is raised by a user. The aggregate values are calculated at all blue nodes based on linked entities (105).

The processing of the incoming signal at the blue node comprises of verifying if the incoming signal is a "+<entity object> type. If the signal is "+<entity object>, then add link to the signaled business entity. Further for each outgoing process edge, determine the set of business entity objects that are to be sent for processing and send "+<entity object> signals corresponding to each business entity for processing. If the incoming signal is "−<entity object>, then remove the link to the signaled business entity and for each outgoing process edge determine the set of business entity objects to be sent for processing and send "−<entity object> signals corresponding to each business entity for processing. Further invoke recalculation of the aggregate values.

The aggregation values are propagated upwards so that aggregate values at grey nodes are also calculated (106). The operations in a grey node are described comprises checking if the signal matches with the conditions specified in the outgoing signal edge for each outgoing signal edge and sending the signals to a child node for processing if the signal matches with the specified condition. Once these signals are processed, the structure is ready to handle OLAP query requests. In other words, once the acyclic graph structure is up and running, real time processing support is provided for the OLAP query.

According to an embodiment herein, the "+<entity object> signal indicates that a new entity has been created and links to that entity need to be added. The "+<entity object> signal indicates that a previous entity has been removed and links to that entity should be removed. In both cases, the aggregated values need to be updated appropriately.

According to an embodiment herein, the "Recalculate aggregate value" method is found in both blue and grey nodes. The recalculate aggregate value is invoked in a node based on the input. If the aggregate value is changed, the new aggregate value is then propagated upward and an aggregate value update of the parent node is invoked.

Figure 2:
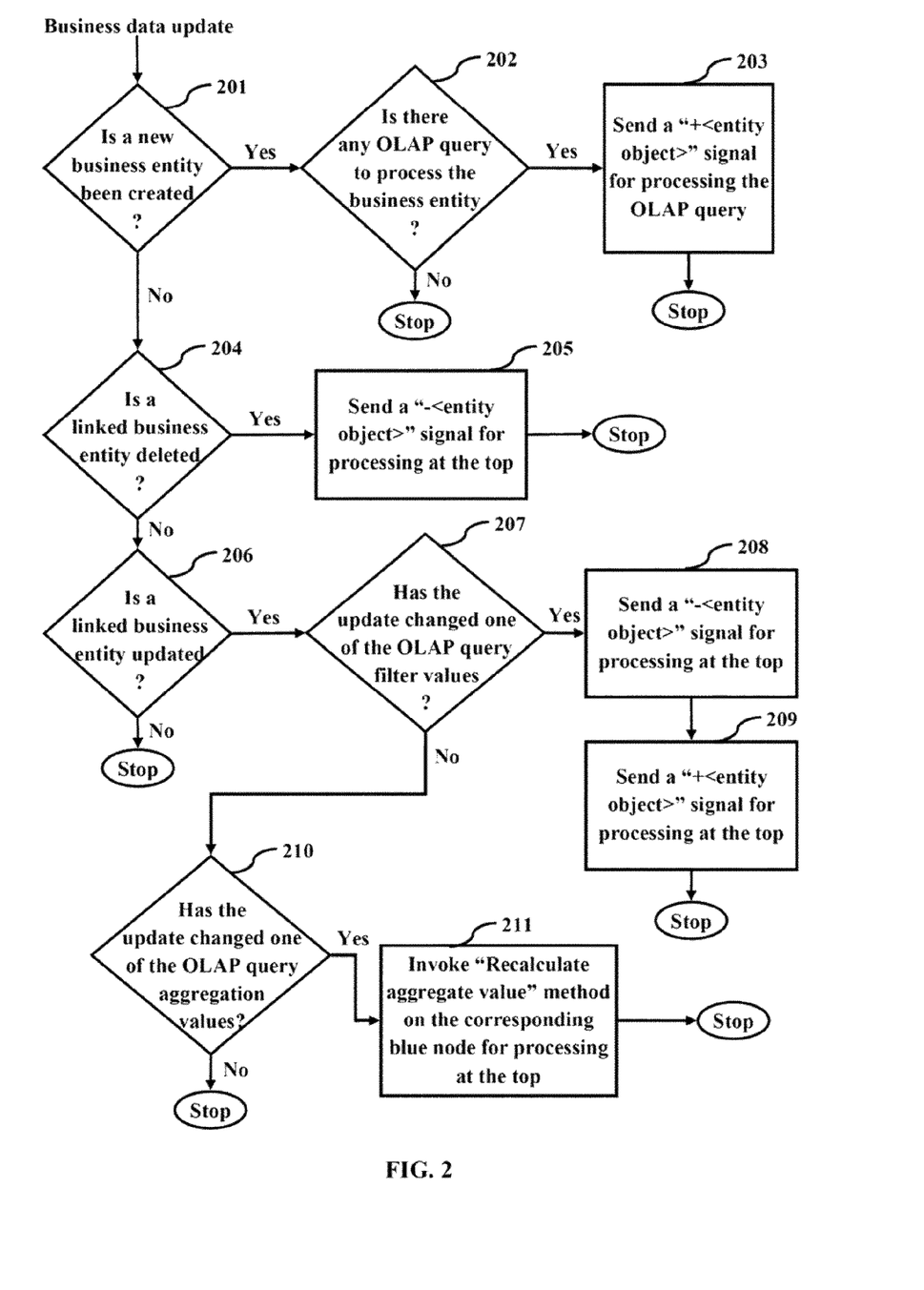
FIG. 2 illustrates a process flow chart for modifying the graph structure in response to a modification in business data, according to an embodiment of the present disclosure.

FIG. 2 illustrates a process flow chart for modifying the graph structure in response to a modification in business data, according to an embodiment of the present disclosure. Specifically, the FIG. 2 illustrates the steps to be performed after business data gets updated by a business transaction. All business related data and information updates are analyzed and given as input to one of a grey node. After the business data update, a search is performed to check whether a new business entity is created or not (201). If a new business entity is created, then again an action is performed to check if any OLAP query is raised to process the created business entity (202). The process is termination if there is no new OLAP query. In case of an OLAP query, a "+<entity object>" signal is sent at the top of hierarchy of the nodes for processing as per the OLAP query (203).

If a new business entity is not created then an action is initiated to check whether a linked business entity is deleted or not (204). If any linked business entity is deleted, then a signal ""−<entity object>" signal is sent to the top of the hierarchy of nodes for processing (205).

If no linked business entity is deleted, then it is checked if any linked business entity is updated or not (206). If a linked business entity is updated, then again a check is performed to determine whether the update has changed any of the OLAP query filter values or not (207). If there is change in the OLAP query filter values, then a signal "−<entity object> is sent to the top of the nodes for processing (209). Further a second signal "+<entity object>" is sent at the top of the hierarchy of nodes for processing (209).

If there is no change on the OLAP query filter values in response to a linked business entity update, then a check is performed whether the update changed any one of the OLAP query aggregation values (210). If any one of the OLAP aggregation values is found to be changed, then a recalculate aggregate value method is invoked on the corresponding blue node for processing at the top of the hierarchy of nodes and the process is terminated. (211).

According to an embodiment herein, the real time OLAP queries are pre-processed and links to business entities participating in the query are maintained. The links are dynamically updated at runtime as business data gets updated after new business transactions are processed. Along with the links to the relevant business entities, some aggregated information are also maintained and updated dynamically. The aggregation includes operations like SUM, COUNT, AVERAGE, etc.

Figure 3:
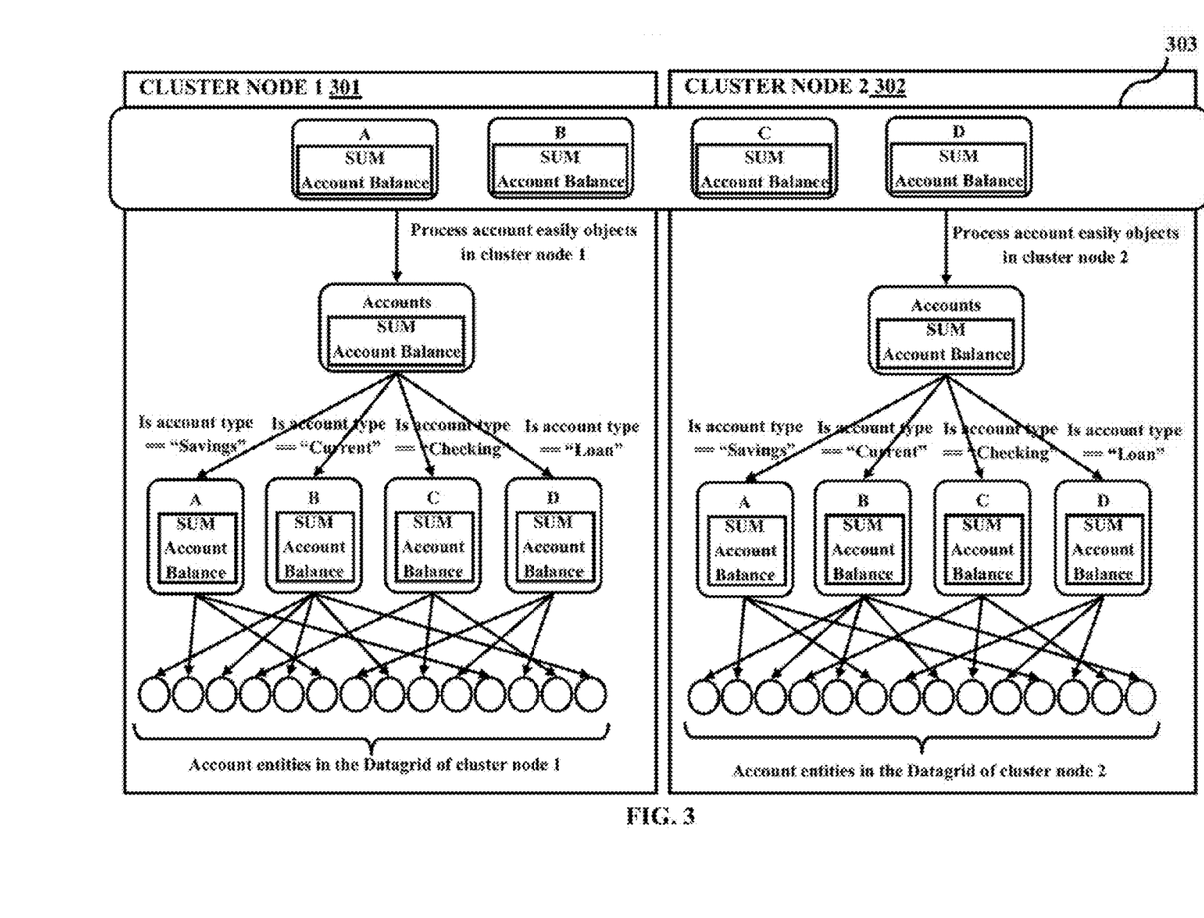
FIG. 3 illustrates a block diagram representing multiple OLAP queries on a single entity, according to an embodiment of the present disclosure.

FIG. 3 illustrates a block diagram representing multiple OLAP queries on a single entity, according to an embodiment of the present disclosure. When business data is partitioned across different cluster nodes such as cluster node 1 301, cluster node 2 302, etc., the embodiments herein still enables processing of OLAP queries. Each of the Cluster node 1 301 and the cluster node 2 302 comprises a plurality of nodes A, B, C, D, etc. under a defined Accounts node. The different nodes are arranged in hierarchy with the Account node at the top followed by the A, B, C, D nodes. The Account node is also referred to as grey node and the nodes below the grey nodes are referred to as blue nodes. From each of the A, B, C, D nodes, one or more links connect to account entities in the DataGrid. The account entities are shown in circular shapes. In a distributed cluster with multiple nodes (with each node having its own DataGrid), OLAP query results are calculated from different nodes and merged easily to produce the desired final output. The query results from individual cluster node 1 301 and cluster node 2 302 are merged in the shared distributed cache 303. Different push/pull mechanisms are used to merge the OLAP query results into the distributed cache 303. The mechanism comprises polling based on specific time intervals, on query request and a continuous synchronization. In the case of polling based on specific time intervals, OLAP data from the cluster node 1 301 and cluster node 2 302 is pulled into the distributed cache 301 and merged after specific time intervals. In the case of on query request where a OLAP query request is received, the OLAP data from the cluster node 1 301 and the cluster node 2 302 is pulled into the distributed cache 303, merged, and the result is sent back. In the case of continuous synchronization whenever OLAP data in any cluster node is updated, the update is sent to the distributed cache 303 as well.

Figure 4:
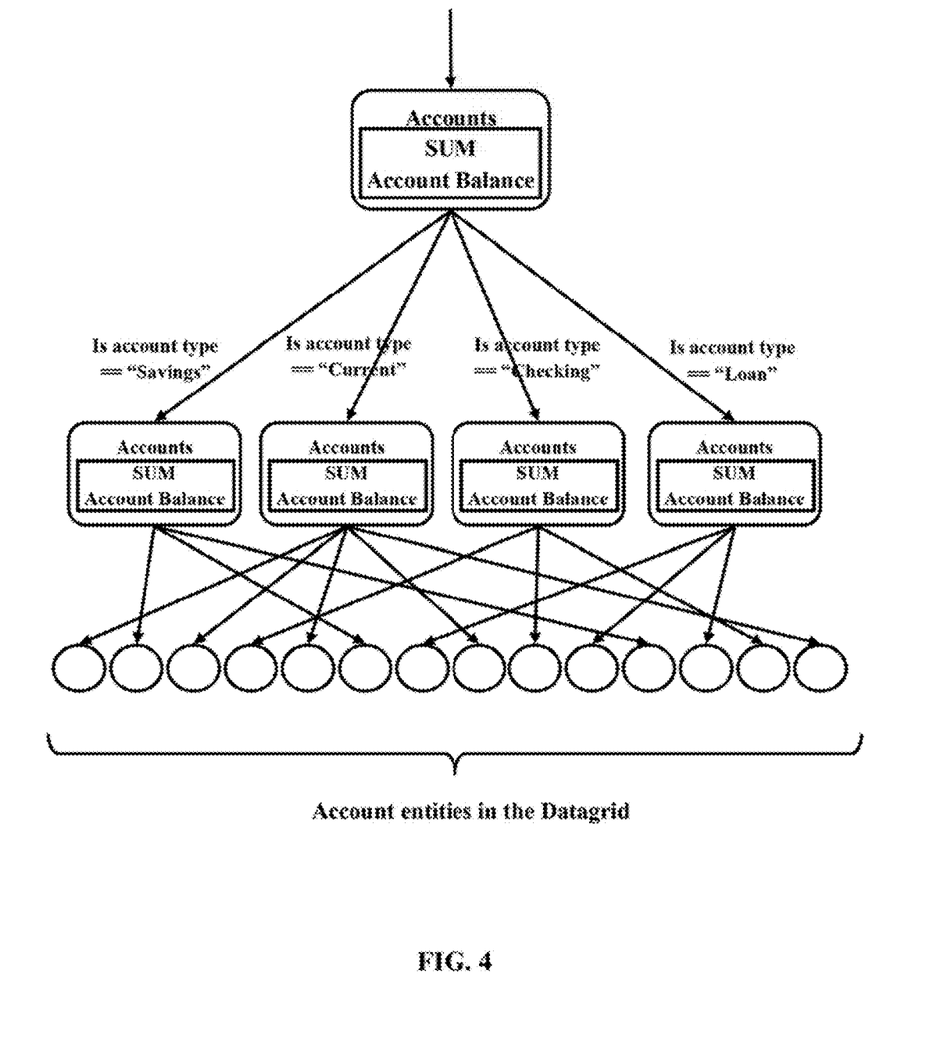
FIG. 4 is a scenario diagram for building a real time OLAP query to determine the sum of account balances grouped by account type needs, according to an example embodiment of the present disclosure.

FIG. 4 is a scenario diagram illustrating building a real time OLAP query to determine the sum of account balances grouped by account type needs, according to an example embodiment of the present disclosure The example herein considers a scenario where each account entity has an account type attribute. Here all account business entities are stored in a datagrid.

The plurality of nodes A, B, C, D are arranged in hierarchy with Account node at the top followed by the A, B, C, D nodes. In the hierarchy, the Account node is also referred to as grey node and the nodes below the grey nodes are referred to as blue nodes.

The plurality of nodes A, B, C, D, etc comprises one or more account entities such as individuals, companies, etc. The account entities are represented in circles and each of the Account entity adopts an Account Type attribute such as savings, current, checking, loan etc. The one or more account business entities are stored in a DataGrid. A real time OLAP query is built to determine the sum of all account balances grouped by account type. The OLAP query is expressed as:

```
SELECT SUM (ACCOUNT.balance)
FROM ACCOUNT
GROUP BY ACCOUNT.account_type
```

A directed acyclic graph as shown in the FIG. 4 is built. The nodes in the directed acyclic graph are comprises one or more blue nodes to maintain links to the relevant business entity objects stored in the datagrid and one or more grey nodes to store aggregated values resulted from operations such as SUM, COUNT, AVG etc. The business entity objects hold the aggregated values.

With respect to FIG. 4, two types of signals are sent at the top of the hierarchy of nodes for processing, comprising a "+<entity object>" and a "−<entity object>". The plus signal indicates that a new entity is created and links to the new entity is to be added. The minus signal indicates that a previous entity is removed and links to the previous entity is to be removed. In both cases, aggregated values are updated appropriately.

Further with respect to FIG. 4, consider an Account entity with Account Type="Checking". When the entity is first created, a "+<account entity object>" signal is sent for processing to the Accounts node by an administrator. From the "Accounts" node, the signal is sent further to node C because the account type is 'Checking'. The node C is a blue node that maintains a link to the incoming entity and updates the SUM value appropriately. After processing, each blue node maintains links to all Account entities in the datagrid which are of that particular account type. A SUM value is also maintained which is the sum of all account balances for linked account entities. An overall SUM value is also maintained for all account entities.

With respect to FIG. 4, whenever Account entities are updated as a result of business transactions, the following updates are made to the graph. When the account balance gets updated, the sum value is updated. The update propagates one level up to the sum value maintained in "Accounts" node. When an account type is changed, for instance, from "Current" to "Savings", two signals "−<account entity object>" and "+<account entity object>" are sent for processing at the top node of the hierarchy. After processing, the link from node B to that account entity is removed. A new link is then added from node A to the updated account entity object.

Similarly, when an account is deleted, a "−<account entity object>" signal is sent for processing. After processing, the link to that account entity is removed. When a new account is added, a "+<account entity object" signal is sent for processing. After processing, based on the account type, a link to that account entity is maintained from the appropriate node.

When the OLAP query is executed for a particular account type upon request by the user, the sum is returned for the particular account type. One or more new real time OLAP queries are configurable to the system in runtime. The graph structure is built dynamically when the query is added, the appropriate signals are sent for processing, links are populated and aggregated values are calculated. Finally, the OLAP query becomes operational and starts serving OLAP requests from the user.

Figure 5:
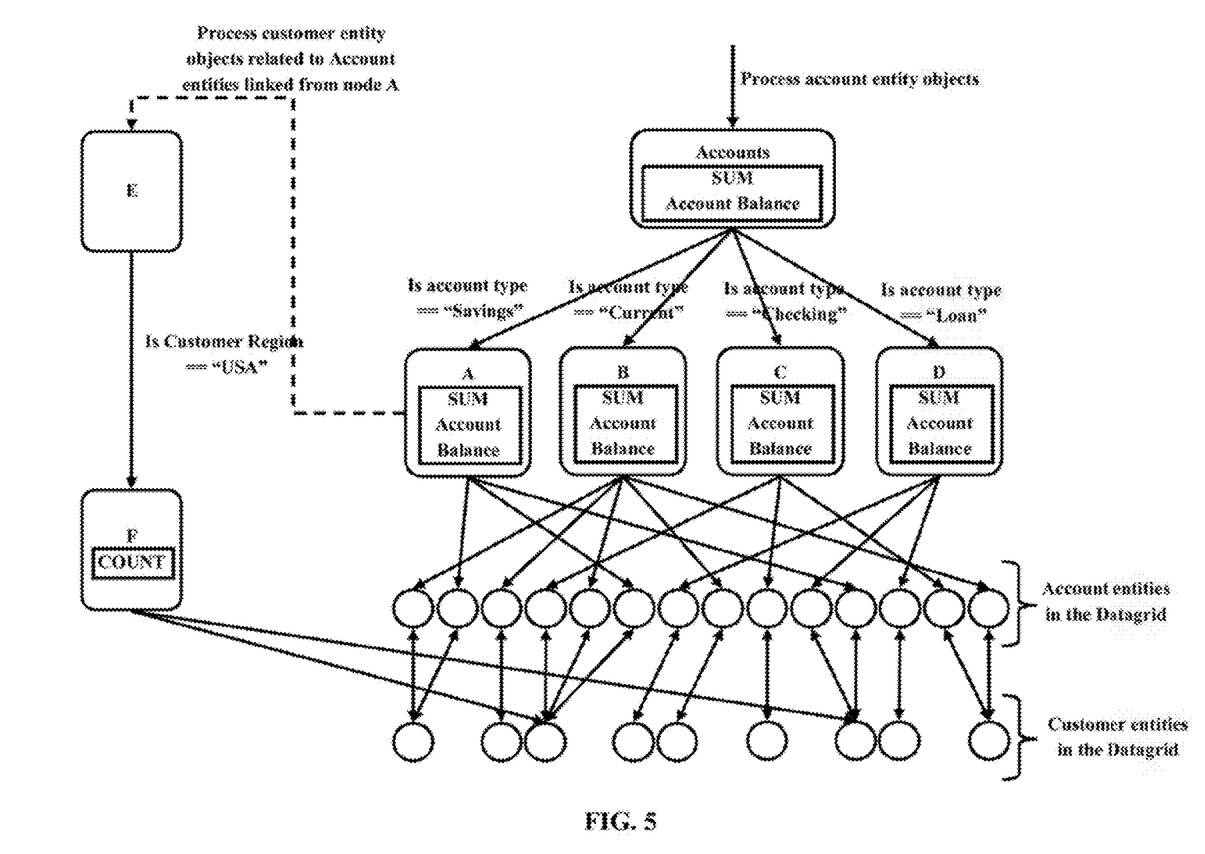
FIG. 5 is a scenario diagram illustrating enabling a joint operation between the customer table and the account table, according to another example embodiment of the present disclosure.

FIG. 5 is a scenario diagram illustrating enabling a joint operation between the customer table and the account table, according to another example embodiment of the present disclosure. With respect to FIG. 5, in the DataGrid, business entities have business relationships with other business entities. A business relationship depicted by a bidirectional arrow is a bidirectional link between two business entities that are related. The bidirectional link is shown between a Customer business entity in the DataGrid and one or more Account entities in the DataGrid.

A directed acyclic graph for the OLAP query is constructed. Once the graph structure is constructed, signals of the type "+<customer entity object>" are raised for all customer entities related to the account entities linked from the node A. If any of the customer entities signaled to node E have region as 'USA', those customer entities are further sent to node F for processing. The node F is a blue node that adds a link to that customer entity. The aggregation is also performed for the COUNT operation.

When a new OLAP request for this OLAP query arrives, the count value maintained in node F is fetched and the response is sent back in real time.

Figure 6:
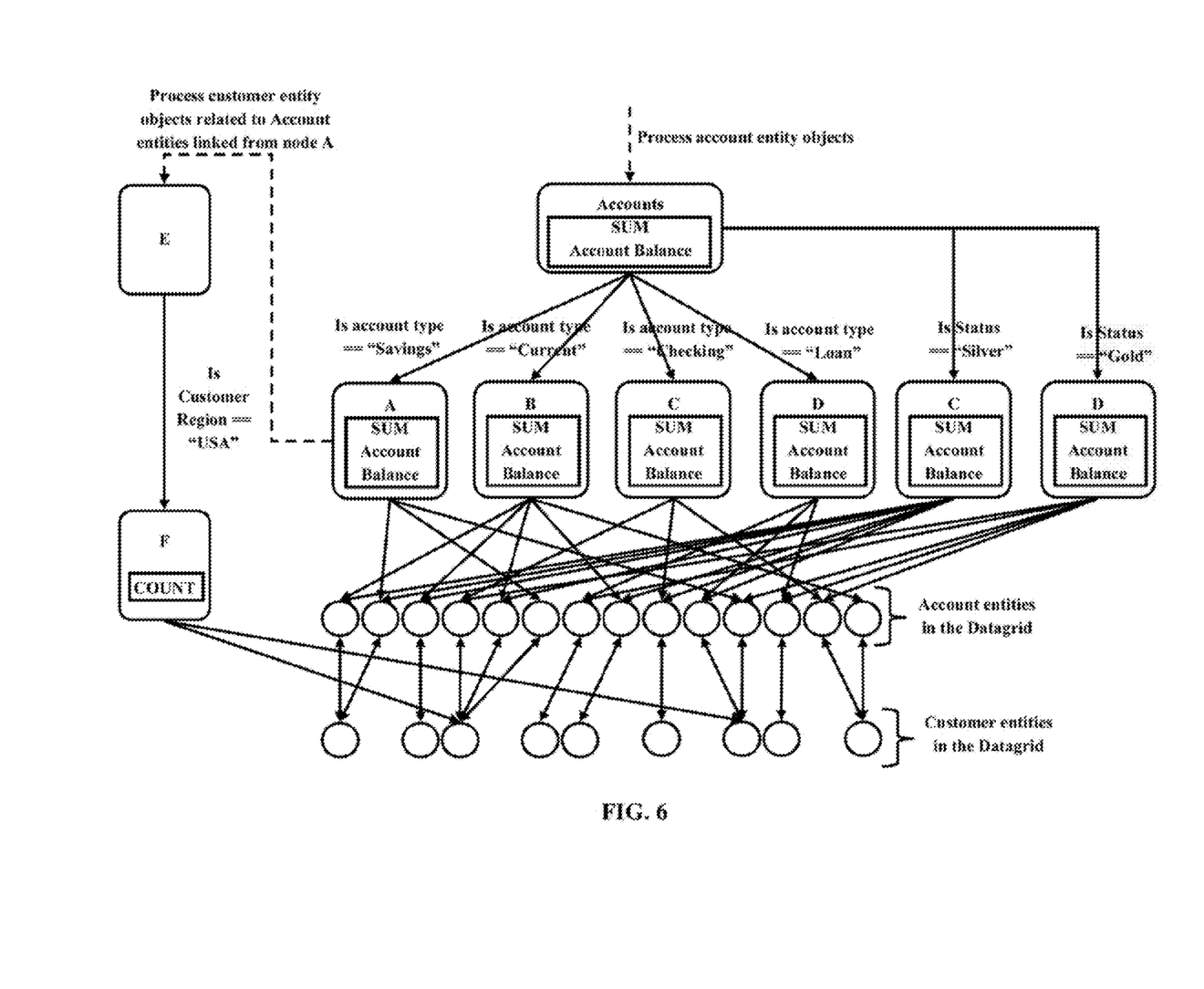
FIG. 6 is a scenario diagram for handling of multiple OLAP queries on a single entity by merging graph structures of the OLAP queries, according to another example illustration of the present disclosure.

FIG. 6 is a scenario diagram for handling of multiple OLAP queries on a single entity by merging graph structures of the OLAP queries, according to another example illustration of the present disclosure. Suppose an Account has status as Silver, Gold or Platinum. Consider another real time OLAP query acting on Account entity:

```
SELECT AVG (ACCOUNT.balance)
FROM ACCOUNT
GROUP BY ACCOUNT.status
```

The graph for this query is merged with the graph from the previous illustrations as shown in the FIG. 6.

According to an embodiment herein, for any real time OLAP query, a direct acyclic graph is used to represent the query. The direct acyclic graph holds links to the relevant business entities that match the query filter parameters specified in the OLAP query. One or more aggregation fields such as SUM, COUNT, AVG, etc are also added and maintained in the graph structure.

When a new query is received, by using the aggregated field and the links maintained in the graph structure, the query results are calculated and the result are sent back in real time.

According to an embodiment herein, when the data is partitioned across different cluster nodes in a cluster, the method enables to determine query results across different cluster nodes, consolidate them and send back the final result in real time.

According to an embodiment herein, considering a special case where business data is stored as entity objects in a DataGrid and business entity objects have bidirectional edges connecting them to represent relevant business relationships. For this particular case, the embodiment herein is much more efficient in processing real time OLAP queries when compared to other approaches (RETE rules engine, B-tree indices etc).

According to an embodiment herein, the method works successfully with new OLAP queries that are added into the production system in runtime. When a new real time OLAP query is added to the system, the graph structure corresponding to that query is constructed, links to relevant business entities are maintained and aggregate values (SUM, COUNT, TOTAL etc) are calculated. Once this structure is up and running, real time processing support will be provided for this OLAP query.

According to an embodiment herein, the method provides successful results even with complex queries involving join operations spanning multiple entity types.

According to an embodiment herein, the OLTP data is represented in the In-Memory Graph DataGrid using a collection of nodes and edges. Each node or an edge comprises one or more number of key-value pairs associated with it. For example, In one case a node for a Customer with values (Node Type="Customer", Name="Acme Inc.", Email=acme@email.com") is associated through an edge to another node with values {Node Type="Account", Balance="10,000"} representing the Account for that customer.

According to an embodiment herein, the In-Memory Graph DataGrid is schema-independent which provides flexibility in regular operation. The data in the graph structure, represented by nodes and edges, are allowed to be changed dynamically without reloading the DataGrid. The new key-value attributes is also allowed to be added to a node in a schema-independent way.

According to an embodiment herein, the OLAP queries are dynamically constructed in the In-Memory DataGrid by adding new nodes and edges. The nodes represent consolidated values for a particular filter selection and the filter nodes are linked to all data nodes via edges. The values of the filter nodes are updated dynamically after every transaction is completed on a linked data node. Thus, OLAP queries are built flexibly, and the results of the OLAP queries are obtained with high performance.

According to an embodiment herein, all data related to the business entities, rules and their attributes, entity configuration metadata, security, performance, configuration and monitoring etc are maintained in the same graph structure and are interconnected. Thus, the graph structure is a fabric giving a consolidated view of the entire application, offering integrated OLTP, OLAP and monitoring capabilities. The graph structure becomes an easy extension point to add artificial intelligence (AI) capabilities to improve system performance and automated maintenance.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification.

What is claimed is:

1. A method for representing OLAP (Online Analytical Processing) queries in a data grid in real time, the method comprising the following steps:
   receiving a new OLAP query;
   building a directed acyclic graph structure for the OLAP query;
   initializing the graph structure by generating signals for one or more business entities, wherein said signals trigger at least one of an addition of a new business entity into said directed acyclic graph structure and removal of a specific business entity from said directed acyclic graph structure;
   processing the generated signals of the one or more business entities;
   linking the business entities based on matching of query filter parameters specified in the OLAP query; and
   calculating aggregate values at one or more a plurality of nodes of the directed acyclic graph structure;
   wherein said OLAP queries are represented in the data grid as a collection of the plurality of nodes, and wherein each of said plurality of nodes incorporate a key-value pair, said key-value pair indicative of at least a type of a node and the aggregate value stored at the node.

2. The method of claim 1, wherein the nodes in the directed acyclic graph comprises:

a plurality of blue nodes adapted to maintain links to one or more business entities stored in a data grid and to hold calculated aggregate values; and
  a plurality of grey nodes adapted to hold the calculated aggregate values, wherein the calculated aggregate values comprise at least one of SUM, ACCOUNT and AVG.

3. The method of claim 2, wherein the step of processing the signals further comprises:
  building links in the blue nodes for one or more relevant business entities;
  calculating aggregate values in the blue nodes from linked business entities; and
  propagating aggregated values to other aggregate values in the grey nodes.

4. The method of claim 1, further comprises the step of modifying the entity links and the aggregated values in the directed acyclic graph structure in response to a modification in the business data.

5. The method of claim 1, further comprises the step of representing multiple OLAP queries on a single entity by merging directed acyclic graph structure for each OLAP query.

6. The method of claim 1, wherein the method further comprises the following steps:
  merging query results from individual data grid in a shared distributed cache; and
  merging results from OLAP queries from a plurality of data grids.

7. The method of claim 6, wherein a plurality of push/pull mechanisms are employed to merge OLAP query results into the distributed cache.

* * * * *